(12) United States Patent
Ozaki et al.

(10) Patent No.: US 8,746,737 B2
(45) Date of Patent: Jun. 10, 2014

(54) GAS GENERATOR

(71) Applicant: Daicel Corporation, Osaka (JP)

(72) Inventors: Nobuhiko Ozaki, Tatsuno (JP);
Masayuki Yamazaki, Tatsuno (JP);
Takao Kuroda, Tatsuno (JP); Mikio Yabuta, Tatsuno (JP)

(73) Assignee: Daicel Corporation, Osaka (JP)

(*) Notice: Subject to any disclaimer, the term of this patent is extended or adjusted under 35 U.S.C. 154(b) by 0 days.

(21) Appl. No.: 13/793,887

(22) Filed: Mar. 11, 2013

(65) Prior Publication Data

US 2013/0255528 A1    Oct. 3, 2013

Related U.S. Application Data

(60) Provisional application No. 61/616,192, filed on Mar. 27, 2012.

(30) Foreign Application Priority Data

Mar. 27, 2012 (JP) .................. 2012-071645

(51) Int. Cl.
*B60R 21/26* (2011.01)
(52) U.S. Cl.
USPC ........................................ 280/741
(58) Field of Classification Search
USPC .................. 280/741; 439/188, 507, 557, 567; 200/51.1
See application file for complete search history.

(56) References Cited

U.S. PATENT DOCUMENTS

| | | | |
|---|---|---|---|
| 5,241,910 A * | 9/1993 | Cunningham et al. | 102/530 |
| 6,257,910 B1 * | 7/2001 | Mramor | 439/188 |
| 6,419,510 B2 * | 7/2002 | Shiraki et al. | 439/188 |
| 6,699,059 B2 * | 3/2004 | Nagamine et al. | 439/352 |
| 6,964,579 B2 * | 11/2005 | Seminara et al. | 439/352 |
| 2003/0010247 A1 * | 1/2003 | Miyaji et al. | 102/530 |
| 2004/0248475 A1 | 12/2004 | Seminara et al. | |
| 2009/0302586 A1 | 12/2009 | Glockler | |

FOREIGN PATENT DOCUMENTS

| | | |
|---|---|---|
| DE | 20 2006 019 196 U1 | 4/2007 |
| DE | 10 2007 025 368 A1 | 12/2008 |
| DE | 10 2008 052 399 A1 | 4/2010 |

OTHER PUBLICATIONS

International Search Report and Written Opinion issued in International Application No. PCT/JP2013/056218 on Jun. 13, 2013.

* cited by examiner

*Primary Examiner* — Faye M. Fleming
(74) *Attorney, Agent, or Firm* — Birch, Stewart, Kolasch & Birch, LLP (57) ABSTRACT

A gas generator includes a metallic housing, an ignition device including an igniter assembly, and gas generating agent, the igniter assembly including an igniter main body fixed to a metallic cylindrical fixing member with a resin and a connector-connecting portion for fitting a connector, at least part of the metallic cylindrical fixing member being electro-conductive to the housing, and including an exposed portion exposed to an inner surface of the connector-connecting portion, the exposed portion of the metallic cylindrical fixing member serving as a ground terminal, when the connector is connected to the connector-connecting portion, the ground terminal being in contact with an earth terminal of the connector, a grounding lead wire of the connector being grounded to a ground circuit located outside the gas generator.

12 Claims, 8 Drawing Sheets

GAS GENERATOR

This nonprovisional application claims priority under 35 U.S.C. §119(a) to Patent Application No. 2012-71645 filed on 27 Mar. 2012, and 35 U.S.C. §119(e) to U.S. Provisional Application No. 61/616,192 filed on 27 Mar. 2012, both of which are incorporated by reference.

BACKGROUND OF INVENTION

1. Field of Invention

The present invention relates to a gas generator for a restraining device such as an airbag system for a vehicle.

2. Description of the Related Art

In a gas generator, a solid gas-generating agent and an igniter for igniting the gas-generating agent are accommodated in a metallic housing to ensure resistance to pressure and heat during actuation. The gas generator is attached inside a module case.

The metallic housing of a conventional gas generator is connected to a metal section of the module case, and the module case is connected to a metal portion of a vehicle body.

Therefore, even when electricity (electric charges) has accumulated in the metallic housing (when the metallic housing is charged), the electric charges are discharged to the vehicle body, thereby preventing the occurrence of unwanted ignition (unpredicted ignition caused by malfunction) caused by electric discharge.

However, in recent years, a damper formed of a rubber or the like is installed between the module case and the gas generator housing, or part of the module case is formed from a resin to prevent a steering wheel from resonating with engine vibrations.

Therefore, the metallic housing of the gas generator is electrically insulated from the outside and the electric charges accumulated in the gas generator housing are not discharged, which can result in an unwanted ignition of the gas generator.

JP-A No. 2003-034217 discloses an airbag inflator. This inflator is held movably with respect to an airbag housing by an annular spring element made from a polymer material and impermeable to gas. The spring element is reliably fixed to the gas generator and module case in order to inhibit vibrations from a vehicle body.

SUMMARY OF INVENTION

The present invention provides a gas generator including:
a metallic housing;
a gas generating agent provided within the housing;
an ignition device accommodated in the housing and including an igniter assembly,
the igniter assembly including,
an igniter main body having an ignition portion charged with a priming and an electro-conductive pin extending from the ignition portion,
a metallic cylindrical fixing member for fixing the igniter main body by a resin, and
a connector-connecting portion for fitting a connector which is to be connected to the electro-conductive pin,
at least part of the metallic cylindrical fixing member being electro-conductive to the housing, and including an exposed portion exposed to an inner surface of the connector-connecting portion, the exposed portion of the metallic cylindrical fixing member serving as a ground terminal,
when the connector is connected to the connector-connecting portion, the ground terminal being in contact with an earth terminal of the connector, a grounding lead wire of the connector being connected to a ground circuit located outside the gas generator.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

In JP-A No. 2003-034217, the spring element is made from a polymer and has a poor electric conductivity. Therefore, electric charges are easily accumulated in the housing and the above-described problem remains unsolved.

The present invention provides a gas generator in which static electricity does not accumulate in a metallic housing and no unwanted ignition occurs.

Further, the present invention provides a gas generator which prevents unwanted ignition due to static electricity. A ground terminal of an annular electro-conductive member, which is in contact with a cylindrical part and an annular part of a closure shell, is in contact with an earth terminal of a connector. As a result, when electric charge is accumulated in a housing, electric charge flows out to a ground circuit via a grounded lead wire connected to the earth terminal of the connector, and thereby accumulation of electric charge is prevented.

In the present invention, electric earthing can be conducted between the housing and the earth terminal, down to a grounding lead wire, to a ground circuit, through parts provided therebetween such as an electro-conductive member and a metallic cylindrical fixing member, or combination of the metallic cylindrical fixing member with the electro-conductive member.

When the gas generator in accordance with the present invention is mounted inside the metallic module case, even when a resin material is present between the gas generator housing and the module case, no static electricity is accumulated in the metallic housing and the occurrence of unwanted ignition is prevented.

In the gas generator in accordance with the present invention, when the connector is connected, static electricity is safely discharged through the connector and the metallic cylindrical fixing member that is in contact with the metallic housing, and accumulation of static electricity is prevented.

The cylindrical fixing member is a member fixing the igniter main body with a resin and may be a portion of the metallic housing of the gas generator. It may be a member separate from the housing, such as an igniter collar. When the cylindrical fixing member is a member separate from the housing, at least a portion of the cylindrical fixing member can be attached directly or indirectly (that is, a state in which electric conduction is possible) with the metallic housing.

Figure 1:
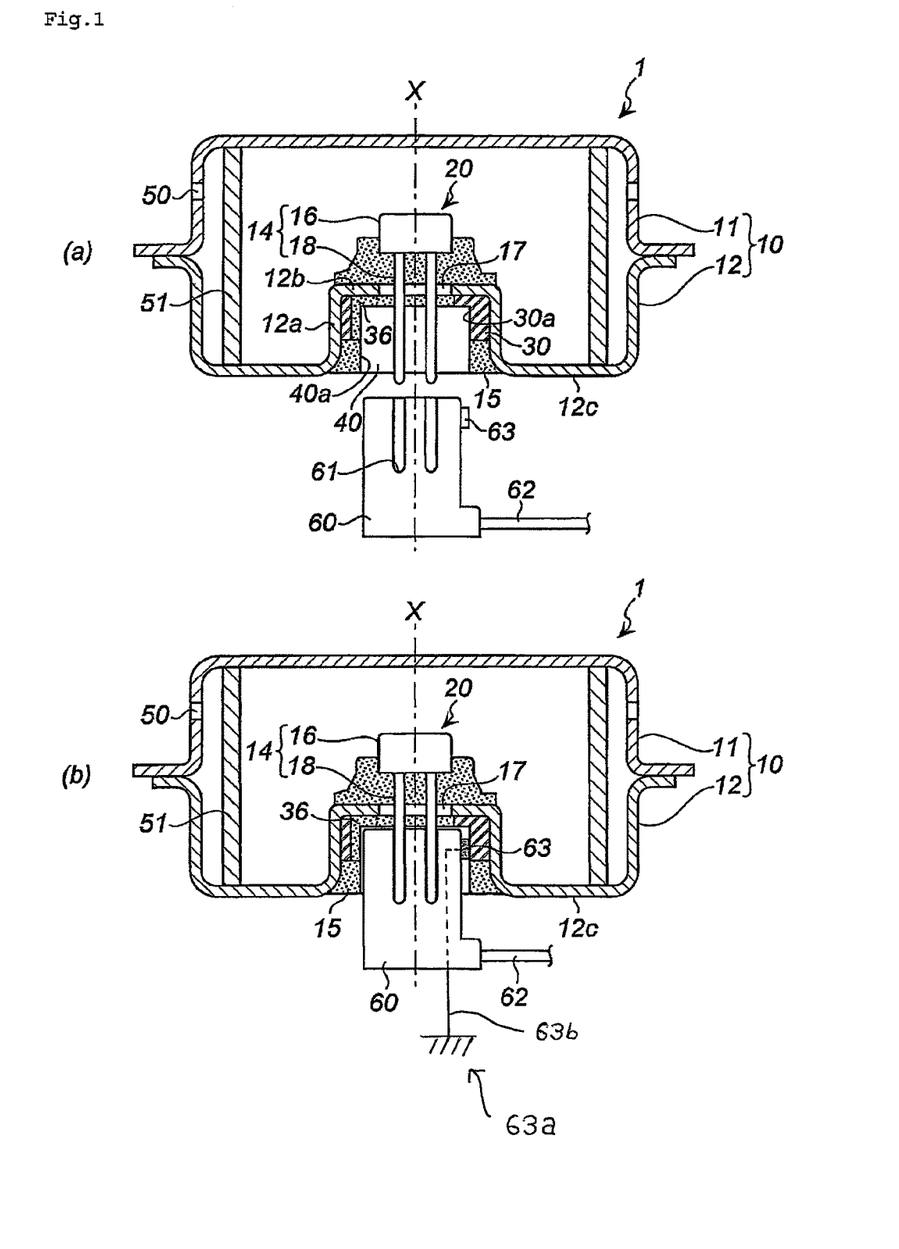
FIG. 1 shows, in (a), a sectional view in the axis X direction of the gas generator in accordance with the present invention, and, in (b), a state in which a connector is inserted in the gas generator shown in (a).

In an igniter assembly of a conventional gas generator, an igniter main body is held by a metal collar, with a resin, and a portion of the metal collar is embedded in the resin (for example, in FIG. 1 of JP-A No. 2003-161599).

In the igniter assembly of the gas generator of the present invention, the cylindrical fixing member serves as the fixing member, is exposed at the inner surface of the connector-connecting portion, and functions as a ground terminal. In this case, the degree to which the cylindrical fixing member is exposed at the inner surface of the connector-connecting portion is not important.

A member formed integrally with a housing (for example, portions obtained by deforming parts of the housing, which are denoted by reference numerals 13a, 13b, 13c in FIG. 1 of JP-A No. 2010-163025), or a metallic retainer fixed to a housing (for example, an igniter collar 66 shown in FIG. 1 and FIG. 3 of JP-A No. 2008-62685) can be used as the metallic cylindrical fixing member. The cylindrical fixing member may have any shape, provided that it has a cylindrical part. The retainer, for example in a cylindrical shape, may be provided at an opening of a closure shell (housing bottom plate) such that the lower end of the retainer is welded to or integrally formed with the bottom plate of the closure shell at the opening. The retainer surrounds the igniter assembly at the resin that holds the igniter main body and fixes the igniter assembly to the housing.

In the gas generator in accordance with the present invention, the exposed portion of the metallic cylindrical fixing member, which is exposed to the inside of the connector-connecting portion is useful to the above-mentioned discharge function.

When the connector is connected to the connector-connecting portion, where a terminal (an earth terminal that is not connected to the electro-conductive pin) attached to the connector is electrically connected to the ground terminal (the exposed portion of the metallic cylindrical fixing member), the ground terminal (the fixing member) is connected to the metallic housing. As a result, electric charges accumulated in the gas generator housing flow to an external ground circuit via a lead wire of the connector.

Therefore, even if the gas generator housing is electrically insulated from the module case, or if the module case is electrically insulated from the vehicle body, the housing and the ground circuit are connected by the lead wire and reliably grounded.

It is preferable that a first feature of the present invention provides a gas generator wherein:

the ground terminal is an annular electro-conductive member that is disposed in contact with the metallic cylindrical fixing member to be exposed to the inner surface of the connector-connecting portion, and the annular electro-conductive member is disposed in contact with the resin fixing the igniter main body.

With connectors with some shapes, the earth terminal is difficult to abut directly against a fixing member, but by using such an electro-conductive member, it is possible to provide a ground terminal adapted to the connector shape.

It is preferable that a second feature of the present invention provides a gas generator wherein:

the ground terminal is an annular electro-conductive member that is disposed in contact with the metallic cylindrical fixing member to be exposed to the inner surface of the connector-connecting portion, the annular electro-conductive member has a groove formed axially in an inner circumferential surface of an annular wall, and the annular electro-conductive member is fixed such that the resin fixing the igniter main body is introduced in the groove, and part of the inner circumferential surface of the annular wall is exposed to the connector-connecting portion.

Since the resin is also introduced into the groove of the annular electro-conductive member, the fixing strength of the annular electro-conductive member to the cylindrical fixing member is increased.

One, or two or more grooves may be formed, but it is preferred that a plurality of grooves be formed equidistantly.

It is preferable that a third feature of the present invention provides a gas generator wherein:

the ground terminal is a substantially annular electro-conductive member that is disposed in contact with the metallic cylindrical fixing member to be exposed to the inner surface of the connector-connecting portion, and the substantially annular electro-conductive member has a shape in which part of an annular wall is cut out and is fixed such that the resin fixing the igniter main body, which may constitute the connector-connecting portion, is also introduced in a cut-out portion, and part of an inner circumferential surface of the annular wall is exposed to the connector-connecting portion.

Since the resin is also introduced in the cut-out portion of the annular electro-conductive member, the fixing strength is increased. A portion of the annular electro-conductive member is cut out and the annular electro-conductive member as a whole has elasticity. Therefore, the annular electro-conductive member may be attached to the cylindrical fixing member by an elastic force and may be further fixed in this state to the cylindrical fixing member by resin.

It is preferable that a fourth feature of the present invention provides a gas generator, wherein:

the ground terminal is an annular electro-conductive member that is disposed in contact with the metallic cylindrical fixing member to be exposed to the inner surface of the connector-connecting portion, the annular electro-conductive member has a groove formed axially in an outer circumferential surface of an annular wall, and the annular electro-conductive member is fixed such that the resin fixing the igniter main body is also introduced in the groove, and an entire of the inner circumferential surface of the annular wall is exposed to the connector-connecting portion.

Since the resin is also introduced in the groove of the annular electro-conductive member, the fixing strength is increased.

One, or two or more grooves may be formed, but it is preferred that a plurality of grooves be formed equidistantly. A groove may be also present in the inner circumferential surface of the annular electro-conductive member, as in the configuration of the second feature.

It is preferable that a fifth feature of the present invention provides a gas generator wherein:

the ground terminal is a substantially annular electro-conductive member abutting against a metallic igniter collar which is the metallic cylindrical fixing member, the igniter collar has an annular shape, the substantially annular electro-conductive member is inserted into the igniter collar, the igniter collar and the housing are in contact with each other, and a part of the substantially annular electro-conductive member is exposed to the connector-connecting portion.

By assembling the metallic igniter collar and the annular electro-conductive member, it is possible to facilitate fixing adapted to shapes of various metallic housings and also facilitate connection to connectors of various shapes.

The annular electro-conductive member may have a groove or a cut-out portion.

It is preferable that a sixth feature of the present invention provides a gas generator wherein:

the ground terminal is an annular electro-conductive member abutting against a metallic igniter collar which is the metallic cylindrical fixing member, the igniter collar has an annular shape and a single or a plurality of protrusions around a hole, the igniter collar and the annular electro-conductive member are assembled such that the inner circumferential surface of the annular electro-conductive member abuts against the protrusion of the igniter collar, the igniter collar and the housing are in contact with each other, and the protrusion of the igniter collar is exposed to the connector-connecting portion.

By assembling the metallic igniter collar and the annular electro-conductive member, it is possible to facilitate fixing adapted to shapes of various metallic housings and also facilitate connection to connectors of various shapes.

It is preferable that a seventh feature of the present invention provides a gas generator, wherein:

the ground terminal is an annular electro-conductive member, abutting against a metallic igniter collar which is the metallic cylindrical fixing member, that is, the ground terminal being combination of an annular electro-conductive member a metallic igniter collar, the igniter collar has a first substrate including a larger diameter, a second substrate including a smaller diameter than the first substrate and formed on the first substrate, a central hole passing through the first substrate and the second substrate, and a single or a plurality of protrusions disposed annularly on the second substrate around the central hole, the igniter collar and the annular electro-conductive member are assembled such that an inner circumferential surface of the annular electro-conductive member abuts against the protrusion on the second substrate, and such that a sealing member is disposed inside an annular groove formed by the annular electro-conductive member, second substrate, and the first substrate, the igniter collar and the housing are in contact with each other, and the sealing member seals an inner circumferential surface of the metallic housing, and the protrusion of the igniter collar is exposed to the connector-connecting portion.

By assembling the metallic igniter collar and the annular electro-conductive member, it is possible to facilitate fixing adapted to shapes of various metallic housings and also facilitate connection to connectors of various shapes.

Further, since the igniter assembly forms an annular groove for inserting the sealing member, the installation and fixing of the sealing member are facilitated.

It is preferable that an eighth feature of the invention provides a gas generator, wherein:

the ground terminal is an annular electro-conductive member abutting against a metallic igniter collar which is the metallic cylindrical fixing member, the annular electro-conductive member has an annular flat surface and a plate-shaped member integrated with the annular flat surface, the plate-shaped member has a first connection section extending vertically from the annular flat surface and a second connection section extending from an end of the first connection section to the annular flat surface through a curved section, the metallic housing and the igniter collar are in contact with each other, and the igniter collar and the annular electro-conductive member are in contact with each other, and the second connection section of the plate-shape member of the annular electro-conductive member is exposed to the connector-connecting portion.

By assembling the metallic igniter collar and the annular electro-conductive member, it is possible to facilitate fixing adapted to shapes of various metallic housings and also facilitate connection to connectors of various shapes.

With the gas generator in accordance with the present invention, the metallic housing is connected to the external ground circuit, and electric charges accumulated in the housing flow to the ground circuit. Therefore, electric charges are prevented from being accumulated in the housing due to static electricity or the like, and malfunction caused by discharge of electric charges is prevented.

Figure 2:
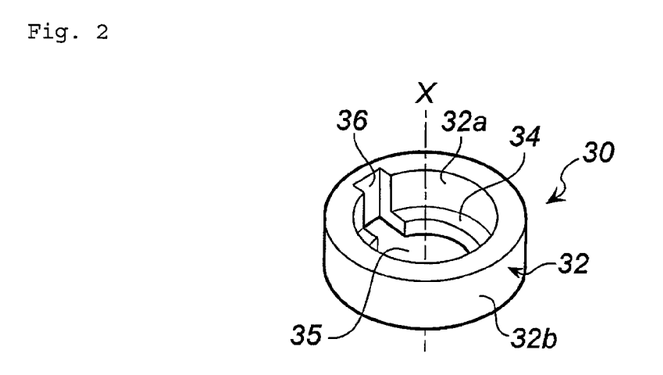
FIG. 2 shows a perspective view of an electro-conductive member used in FIG. 1 and the electro-conductive member inverted from the arrangement state shown in FIG. 1.

Embodiments of Invention (1) Gas Generator Shown in FIG. 1 and FIG. 2

(a) in FIG. 1 shows a cross-sectional view illustrating an embodiment of the gas generator in accordance with the present invention. (b) in FIG. 1 shows the gas generator shown in (a) in FIG. 1 is connected to a connector.

FIG. 2 shows a perspective view of an annular electro-conductive member in FIG. 1 and illustrates the annular electro-conductive member inverted from the state shown in FIG. 1.

A gas generator 1 is used, for example, in an airbag device for a driver side or a passenger side next to the driver.

In a metallic housing 10, a diffuser shell 11 and a closure shell 12 are integrated by welding at respective flange portions. The metallic housing 10 (diffuser shell 11 and closure shell 12) is made from stainless steel or iron.

The diffuser shell 11 has a plurality of gas discharge ports 50 in the circumferential wall surface.

A cylindrical filter 51 is disposed inside the housing 10, the interior of the filter is charged with a gas-generating agent (not shown in the drawing), and an igniter assembly 20 is disposed therein.

The closer shell 12 has a cylindrical part 12*a* extending from the center of a bottom surface 12*c* towards the inside of the housing 10 and an annular part 12*b* extending radially from the cylindrical part 12*a*.

In FIG. 1, the closure shell 12 including the cylindrical part 12*a* and the annular part 12*b* also serves as a metal fixing member.

The igniter assembly 20 is obtained by integrating an igniter main body 14 with the cylindrical part 12*a*, the annular part 12*b* and the annular electro-conductive member 30 by a resin 15. The igniter main body 14 includes an ignition portion 16 and electro-conductive pins 18.

The ignition portion 16 is partially enclosed in the resin 15. The electro-conductive pins 18 pass through a hole 17 of the annular part 12*b*, and are partially enclosed in the resin 15, the remaining portion of the electro-conductive pins being positioned inside a connector-connecting portion 40.

As shown in FIG. 2, the annular electro-conductive member 30 has a cylindrical annular wall 32 and an annular surface 34 protruding radially inward from an opening at one end of the cylindrical annular wall 32. A hole 35 of the annular electro-conductive member 30 is set to have a diameter larger than that of the hole 17.

A groove 36 extending along the axis X direction is formed in an inner circumferential surface 32*a* of the cylindrical annular wall 32 and the annular surface 34. The annular surface 34 lacks a portion corresponding to the groove 36.

The annular electro-conductive member 30 is made from stainless steel or iron same as that of the closure shell 12, or is made from a different metal such as copper or aluminum.

In the annular electro-conductive member 30, the rear surface of the annular surface 34 abuts against the annular part 12*b*, and an outer circumferential surface 32*b* of the cylindrical annular wall 32 abuts against the cylindrical part 12*a*.

Portions of the inner circumferential surface 32*a* and annular surface 34 of the cylindrical annular wall 32 are exposed inside the connector-connecting portion 40 (an exposed surface 30*a*), and the remaining portions are embedded in the resin 15.

Since the resin 15 is introduced in the groove 36, the fixing strength of the annular electro-conductive member 30 to the cylindrical part 12*a* and annular part 12*b* (the closure shell 12) is increased.

An inner circumferential surface 40*a* of the connector-connecting portion 40 is formed by the resin 15 and the exposed surface 30*a* of the cylindrical annular wall 32. Therefore, the inner circumferential surface 32*a* of the cylindrical annular wall 32 and the inner circumferential surface (an exposed surface of the resin 15) 40*a* of the connector-connecting portion 40 are flush with each other.

In such a case, a radial protrusion may be formed at the inner circumferential surface 32*a* of the cylindrical annular wall 32 or the inner circumferential surface (the exposed surface of the resin 15) 40*a* of the connector-connecting portion 40, and a recess corresponding to the protrusion may be formed at the outer circumferential surface of the connector 60 to be connected, thereby imparting a fall-out preventing function, a rotation preventing function, or a connector-positioning function, which ensures mutual fitting when the connector 60 is inserted into the connector-connecting portion 40.

The igniter assembly 20 shown in (a) in FIG. 1 can be manufactured by injection-molding a resin in a predetermined metal die in which the closure shell 12, the igniter main body 14 and the annular electro-conductive member 30 are disposed.

In the gas generator 1 shown in FIG. 1, since the annular electro-conductive member 30 is in contact with the cylindrical part 12*a* and the annular part 12*b* (the closure shell 12) (that is, since the above components are in contact to each other to enable an electric conduction), the exposed surface 30*a* of the annular electro-conductive member 30 serves as a ground terminal, and the inner circumferential surface 32*a* of the cylindrical annular wall 32 is exposed in the connector-connecting portion 40. In this case, the resin is introduced into the groove 36, and the portion other than the groove 36 is exposed in the connector-connecting portion 40.

In case that the cylindrical part 12*a* and the annular part 12*b* are machined to be of the same shape as the annular electro-conductive member 30 in the gas generator 1 shown in FIG. 1, the annular electro-conductive member 30 becomes unnecessary. However, since the machining cost increases in this case, the use of the annular electro-conductive member 30, as shown in FIG. 1, leads to the reduction in the total cost despite the increase in the number of parts.

As shown in (a) in FIG. 1, the connector 60 to be connected to the gas generator 1 has an electro-conductive terminal 61 at the end surface of the insertion hole for the electro-conductive pins 18, and the electro-conductive terminals 61 are connected to a lead wire 62.

Further, the connector 60 also has an earth terminal 63 at a position that is in contact with the exposed surface (ground Terminal)) 30*a* of the annular electro-conductive member 30, and the earth terminal 63 is grounded to a ground circuit 63*a* by a grounding lead wire 63*b* separate from the lead wire 62.

Therefore, when the gas generator 1 in accordance with the present invention is mounted inside the metallic module case, even when a resin material (an electrically insulating material) is present between the gas generator housing 10 and the module case, no static electricity is accumulated at the metallic housing 10 and thereby, it is prevented that unwanted ignition occurs by malfunction due to accumulated static electric charge.

An embodiment with an annular electro-conductive member different from the annular electro-conductive member 30 shown in FIG. 2 will be explained below with reference to FIG. 3.

In the annular electro-conductive member 130, portions of a cylindrical annular wall 132 and an annular surface 134 are cut out. Since such cut-out portions (cut-out portion 138) are present, an elastic force is generated in the electro-conductive member 130. In the annular electro-conductive member 130, the groove 36 such as in the annular electro-conductive member 30 shown in FIG. 2 may be additionally formed in a portion other than the cut-out portion 138.

Figure 3:
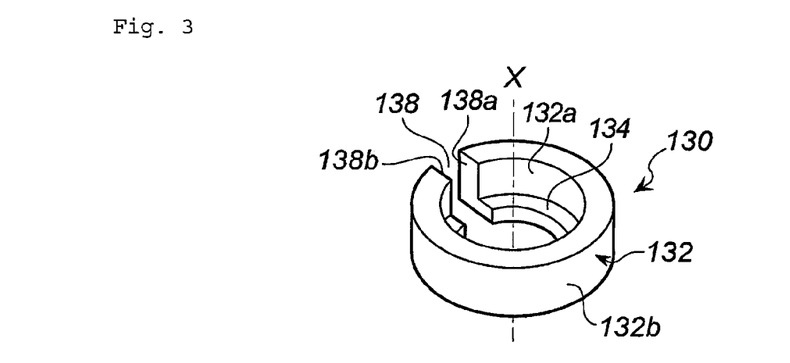
FIG. 3 shows a perspective view of an electro-conductive member of an embodiment other than that shown in FIG. 2.

Before the annular electro-conductive member 130 shown in FIG. 3 is attached to the closure shell 12, the outer diameter thereof is larger than the inner diameter of the cylindrical part 12*a*.

When the annular electro-conductive member 130 is inserted into the cylindrical part 12*a*, an outer circumferential surface 132*b* of the cylindrical annular wall 132 is slightly pressed (an external force is applied) and compressed so as to bring a cut-out surface 138*a* and a cut-out surface 138*b* close to each other, thereby reducing the outer diameter of the annular electro-conductive member 130.

When the external force is thereafter released, the outer diameter expands due to the elastic force, and the annular electro-conductive member is tightly fitted into the cylindrical part 12a.

The igniter assembly including the annular electro-conductive member 130 is manufactured by injection-molding a resin in a predetermined metal die in which the closure shell 12, the igniter main body 14, and the annular electro-conductive member 130 are disposed.

Since the resin 15 is introduced in the cut-out portion 138 in the igniter assembly using the annular electro-conductive member 130, the fixing strength of the annular electro-conductive member 130 to the cylindrical part 12a and annular part 12b (the closure shell 12) is increased.

In the igniter assembly using the annular electro-conductive member 130, the rear surface of the annular surface 134 abuts against the annular part 12b, and an outer circumferential surface 132b of the cylindrical annular wall 132 abuts against the cylindrical part 12a.

Portions of the inner circumferential surface 132a of the cylindrical annular wall 132 connector-connecting portion 40, and the remaining portions are embedded and the annular surface 134 are exposed inside the the in the resin 15.

In the gas generator having the igniter assembly including the annular electro-conductive member 130, since the annular electro-conductive member 130 is in contact with the cylindrical part 12a and the annular part 12b (the closure shell 12), the exposed surface of the annular electro-conductive member 130 serves as a ground terminal.

An embodiment with an annular electro-conductive member different from the annular electro-conductive members 30 and 130 shown in FIG. 2 and FIG. 3 will be explained below with reference to FIG. 4.

An annular electro-conductive member 230 has a cylindrical annular wall 232 and an annular surface 234 protruding radially inward from an opening at one end of the cylindrical annular wall 232. A hole 235 of the annular electro-conductive member 230 is set to have a diameter larger than that of the hole 17.

Four grooves 236 extending along the axis X direction are formed equidistantly in an outer circumferential surface 232b of the cylindrical annular wall 232. It is possible that only a single groove 236 is used, but preferably a plurality of grooves is formed equidistantly. The grooves 236 are also formed in the outer surface of the annular surface 234.

The igniter assembly including the annular electro-conductive member 230 can be manufactured by injection-molding a resin in a predetermined metal die in which the closure shell 12, the igniter main body 14, and the annular electro-conductive member 230 are disposed.

Since the resin 15 is introduced in the four grooves 236 in the igniter assembly using the annular electro-conductive member 230, the fixing strength of the annular electro-conductive member 230 to the cylindrical part 12a and annular part 12b (the closure shell 12) is increased.

In the igniter assembly using the annular electro-conductive member 230, the rear surface of the annular surface 234 abuts against the annular part 12b, and an outer circumferential surface 232b of the cylindrical annular wall 232 abuts against the cylindrical part 12a.

The entire inner circumferential surface 232a of the cylindrical annular wall 232 and the entire annular surface 234 are exposed inside the connector-connecting portion 40.

Figure 4:
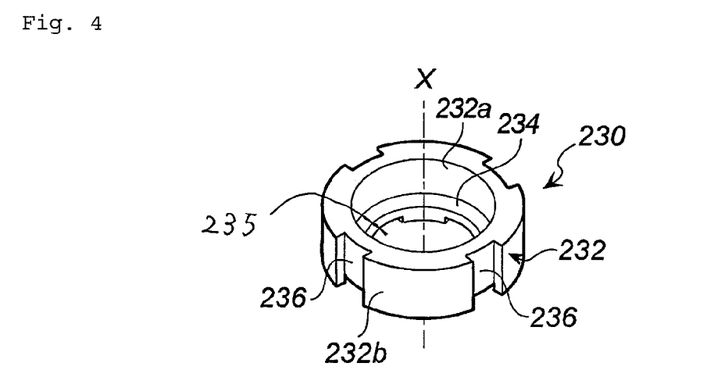
FIG. 4 shows a perspective view of an electro-conductive member of yet another embodiment other than that shown in FIG. 2.

In the gas generator having the igniter assembly including the annular electro-conductive member 230 shown in FIG. 4, since the annular electro-conductive member 230 is in contact with the cylindrical part 12a and the annular part 12b (the closure shell 12), the entire inner circumferential surface 232a of the cylindrical annular wall 232 and the entire annular surface 234 of the annular electro-conductive member 230 serve as a ground terminal.

Figure 5:
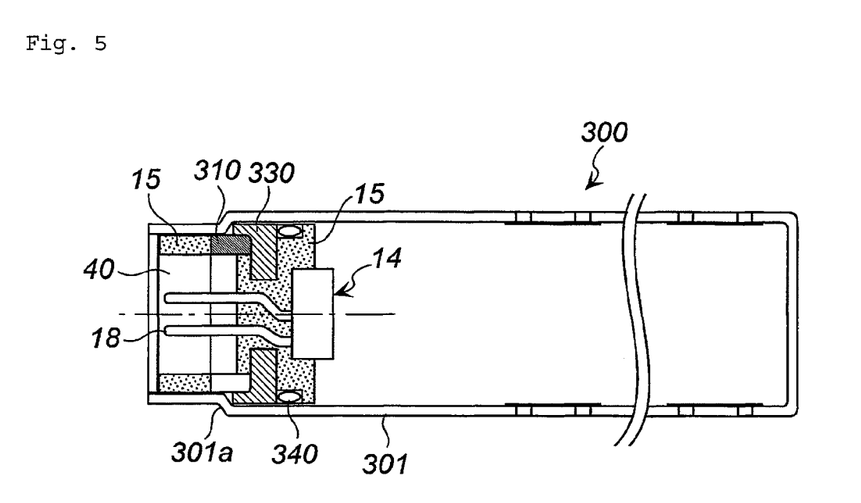
FIG. 5 shows a sectional view in the longitudinal direction of a gas generator of an embodiment other than that shown in FIG. 1.

(2) Gas Generator Shown in FIG. 5

A gas generator 300 shown in FIG. 5 is for use in an airbag apparatus for side-collision protection.

Figure 6:
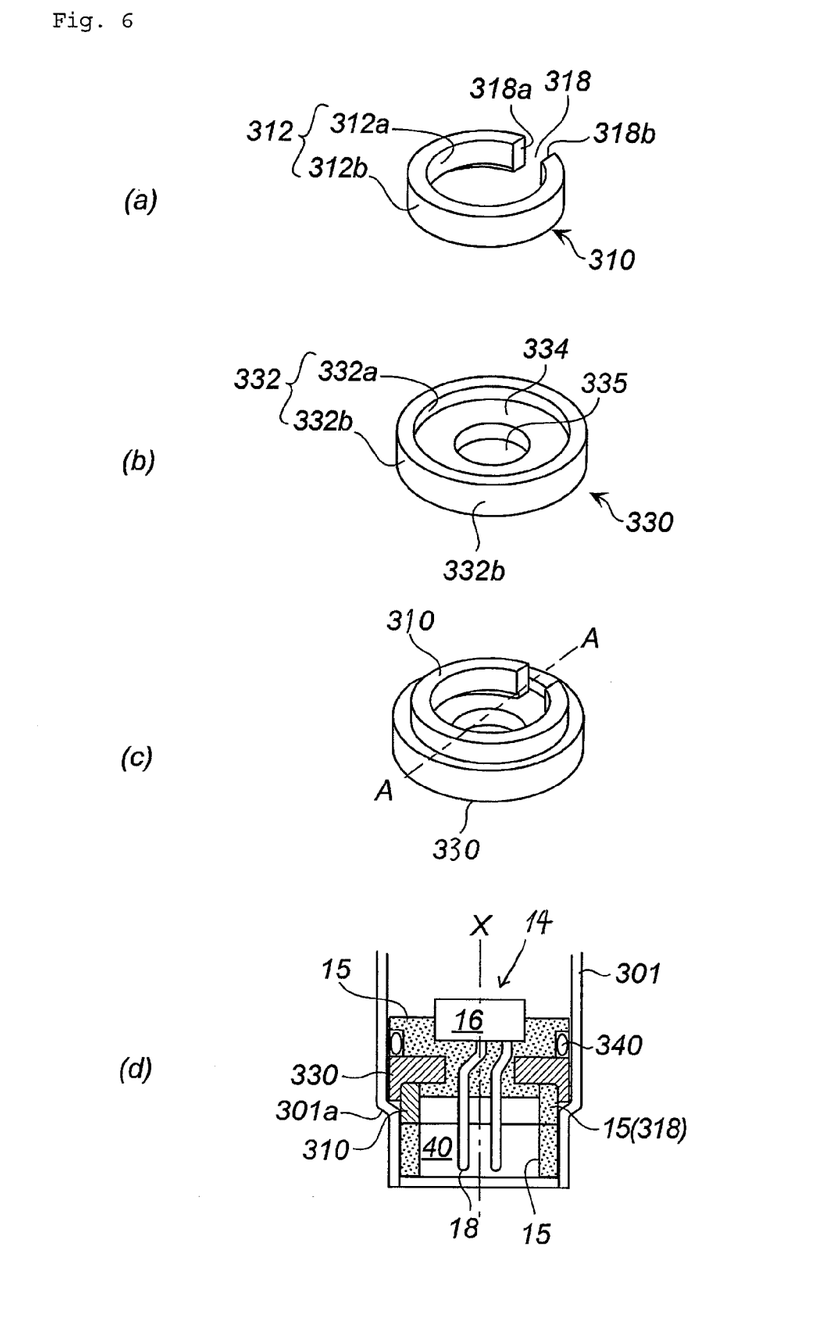
FIG. 6 shows, in (a) to (c), exploded perspective views (explanatory drawings illustrating the assembly) of the igniter collar and the electro-conductive member used in FIG. 5 and the igniter collar and the electro-conductive member inverted from the arrangement state shown in FIG. 1, and in (d), a partial sectional view of the configuration shown in FIG. 5.

A housing 301 is closed at one end, and the igniter assembly shown in (d) in FIG. 6 is attached from an opening in the other end. As shown in (d) in FIG. 6, the igniter assembly is fixed by reducing the diameter or crimping the circumferential edge of the opening in the other end of the housing 301 (a processed section 301a).

The igniter assembly, in which the igniter main body 14, a substantially annular electro-conductive member 310 and an igniter collar 330 are fixed with the resin 15, is used in the metallic housing 301. In the gas generator shown in FIG. 5 and the igniter assembly shown in FIG. 6, the igniter collar 330 corresponds to a cylindrical fixing member.

The igniter main body 14 is the same as shown in FIG. 1 and has the ignition portion 16 and electro-conductive pins 18.

As shown in (a) in FIG. 6, the substantially annular electro-conductive member 310 has a shape in which a portion of a cylindrical annular wall 312 having an inner circumferential surface 312a and an outer circumferential surface 312b is cut out (cut-out portion 318). The cut-out portion 318 has two cut-out surfaces 318a, 318b.

Since the cut-out portion 318 is present, an elastic force is generated in the substantially annular electro-conductive member 310.

An annular member without cut-out portion can be also used instead of the substantially annular electro-conductive member 310 shown in (a) in FIG. 6.

As shown in (b) in FIG. 6, the igniter collar 330 has an annular wall 332 having an inner circumferential surface 332a and an outer circumferential surface 332b and an annular surface 334 protruding radially inward from an opening at one end.

A hole 335 of the igniter collar is large enough for the electro-conductive pins 18 to pass therethrough.

The inner diameter of the igniter collar 330 (inner diameter of the annular wall 332) is set to be slightly less than the inner diameter of the annular electro-conductive member 310.

As shown in (c) in FIG. 6, the annular electro-conductive member 310 and the igniter collar 330 are assembled by inserting the annular electro-conductive member 310 into the igniter collar 330.

When the annular electro-conductive member 310 is inserted into the igniter collar 330, the annular electro-conductive member 310 is compressed inward by applying an external force and inserted in this state (a state in which the two cut-out surfaces 318a, 318b are brought close to each other by compression). When the external force is thereafter released, the annular electro-conductive member 310 is fixed inside the igniter collar 330.

The igniter assembly shown in (d) in FIG. 6 can be manufactured by injection-molding a resin in a predetermined metal die in which the igniter main body 14, and the assembly of the annular electro-conductive member 310 and igniter collar 330 (the assembly in Fig. (c) in 6) are disposed. As shown in (d) in FIG. 6, the most of the inner circumferential surface 312a of the annular electro-conductive member is exposed inside the connector-connecting portion 40.

An O-ring 340 is a seal member disposed when the igniter assembly is mounted inside the housing 301.

In the gas generator 300 shown in FIG. 5, the housing 301, the igniter collar 330, and the annular electro-conductive member 310 are in contact with each other (that is, in contact to enable an electric conduction), the inner circumferential surface 312a of the annular electro-conductive member 310 serves as a ground terminal.

Figure 7:
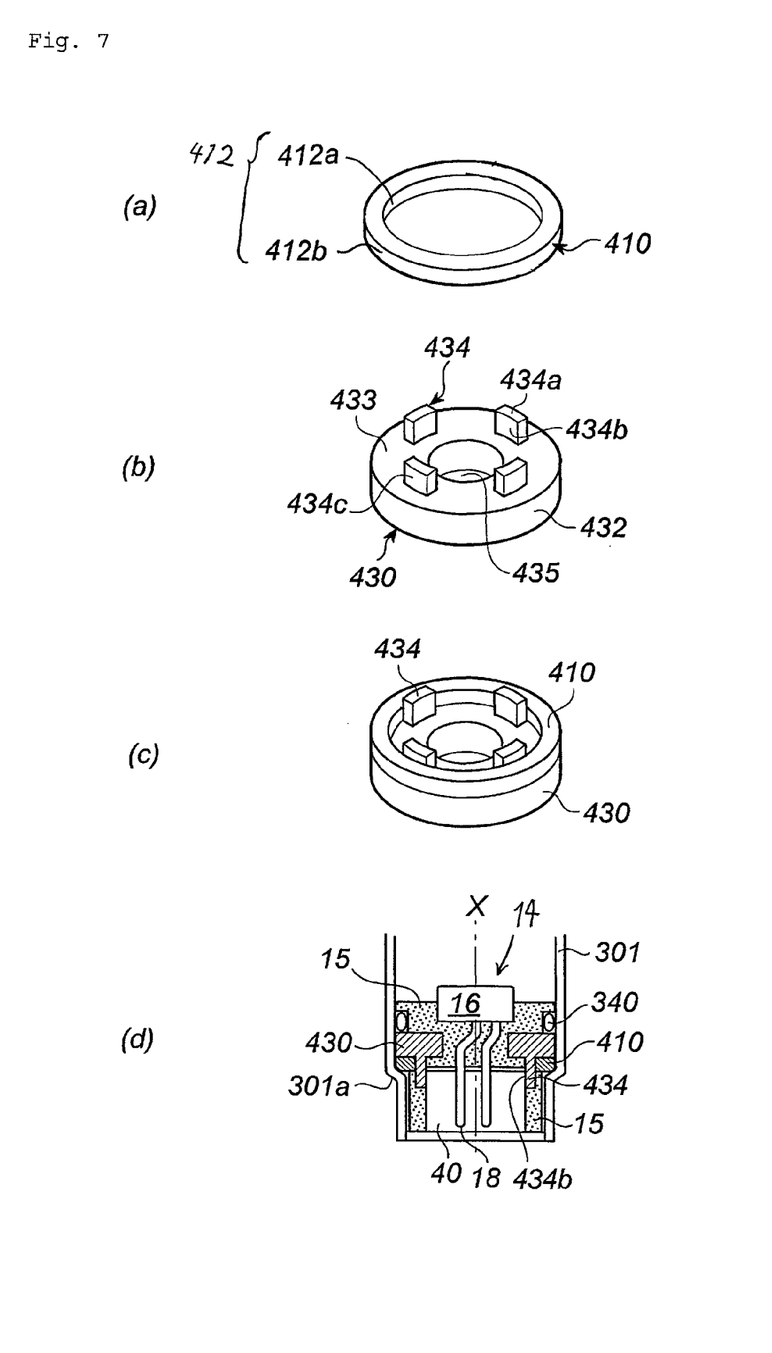
FIG. 7 shows, in (a) to (c), exploded perspective views (explanatory drawings illustrating the assembly) of the igniter collar and the electro-conductive member of an embodiment other than that shown in FIG. 6, and in (d), a partial sectional view corresponding to that in (d) in FIG. 6.

Explained below is an embodiment in which the igniter assembly shown in (d) in FIG. 7 is used instead of the configurations shown in (a) to (d) in FIG. 6 in the gas generator 300 of FIG. 5.

The igniter assembly shown in FIG. 7(d), in which the igniter main body 14, an annular electro-conductive member 410 and an igniter collar 430 are fixed by the resin 15, is used in the metallic housing 301.

The igniter main body 14 is the same as shown in FIG. 1 and has the ignition portion 16 and electro-conductive pins 18.

As shown in (a) in FIG. 7, the annular electro-conductive member 410 includes the cylindrical annular wall 412 having an inner circumferential surface 412a and an outer circumferential surface 412b.

As shown in (b) in FIG. 7, in the igniter collar 430, four protrusions 434 are disposed equidistantly on the same circle of a substrate 433. The protrusions 434 are formed integrally with the substrate 433.

The four protrusions 434 have curved surfaces such that a contact circle (inner contact circle) connecting inner surfaces 434b and a contact circle (outer contact circle) connecting outer surfaces 434c are formed thereby.

In FIG. 7, the four protrusions 434 are plate-shaped protrusions, but protrusions of other shape, for example, a single protrusion in a round columnar (annular) shape can be also used.

The diameter of the outer contact circle is equal to the inner diameter of the annular electro-conductive member 410, and the inner diameter of the inner contact circle is adjusted to be larger than a hole 435. Further, in order to facilitate the fitting of the annular electro-conductive member 410, the outer surface 434c of the protrusions 434 may be tapered (such that the diameter of the outer contact circle increases toward the substrate 433).

The hole 435 of the igniter collar is of a size sufficient for the electro-conductive pins 18 to pass therethrough.

As shown in (c) in FIG. 7, the annular electro-conductive member 410 and the igniter collar 430 are assembled so that the inner circumferential surface 412a of the annular electro-conductive member abuts against the outer surfaces 434c of the four protrusions 434 of the igniter collar 430.

The outer circumferential surface 412b of the annular electro-conductive member 410 and the outer circumferential surface 432 of the substrate 433 of the igniter collar 430 are flush with each other.

The igniter assembly shown in (d) in FIG. 7 is manufactured by injection-molding a resin 15 in a predetermined metal die in which the igniter main body 14, and the assembly of the annular electro-conductive member 410 and igniter collar 430 (in the assembly in (c) in FIG. 7) is disposed. As shown in (d) in FIG. 7, in the four protrusions 434, distal end surfaces 434a are embedded in the resin 15, and the inner surfaces 434b are exposed inside the connector-connecting portion 40.

The O-ring 340 is a seal member disposed when the igniter assembly is mounted inside the housing 301.

When the igniter assembly such as shown in (d) in FIG. 7 is used in the gas generator 300 shown in FIG. 5, the housing 301 and the igniter collar 430 are in contact with each other (that is, in contact to enable an electric conduction) and the inner surfaces 434b of the protrusions 434 of the igniter collar 430 serve as ground terminals.

In this embodiment, the annular electro-conductive member 410 also may abut against the housing 301. Further, the annular electro-conductive member 410 directly abuts against the crimped portion (processed section 301a) and requires a high strength. Therefore, the advantage of the configuration shown in FIG. 7 is that the annular electro-conductive member 410 is formed by processing a high-strength material through a simple processing method such as forging.

In the igniter assembly such as shown in (d) in FIG. 7, as a result of assembling the annular electro-conductive member 410 with the igniter collar 430, the contact surface area of the annular electro-conductive member 410 with the housing 301 is increased, but from the functional standpoint, the annular electro-conductive member 410 can be omitted, as long as the igniter collar 430 has a sufficient strength and is in contact with the housing 301. In other words, in this embodiment, the igniter collar 430 is a cylindrical fixing member and protrusions 434, which are parts thereof, serve as ground terminals.

Figure 8:
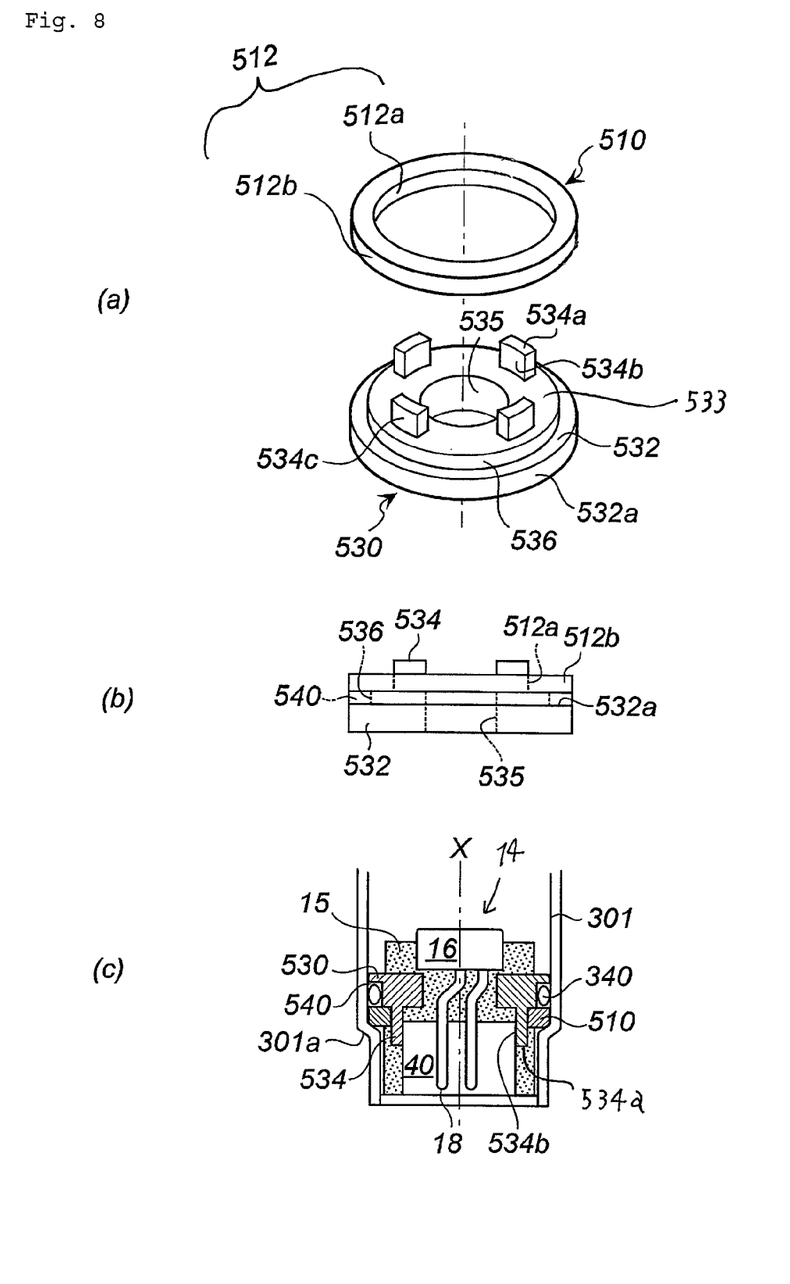
FIG. 8 shows, in (a), an exploded perspective view (explanatory drawing illustrating the assembly) of the igniter collar and the electro-conductive member of yet another embodiment other than that shown in FIG. 6, in (b), a side view taken after the components shown in (a) have been assembled, and, in (c), a partial sectional view corresponding to that in (d) in FIG. 6.

Explained below is an embodiment in which the igniter assembly shown in (c) in FIG. 8 is used instead of the configurations shown in (a) to (d) in FIG. 6 in the gas generator 300 shown in FIG. 5.

The igniter assembly shown in (c) in FIG. 8, in which the igniter main body 14, an annular electro-conductive body 510 and an igniter collar 530 are fixed by the resin 15, is used in the metallic housing 301.

The igniter main body 14 is the same as shown in FIG. 1 and has the ignition portion 16 and electro-conductive pins 18.

As shown in (a) in FIG. 8, the annular electro-conductive member 510 includes the cylindrical annular wall 512 having an inner circumferential surface 512a and an outer circumferential surface 512b.

As shown in (a) in FIG. 8, in the igniter collar 530, a second substrate 533 with an outer diameter less than that of a first substrate 532 is present on the first substrate 532.

Four protrusions 534 are disposed integrally with the second substrate 533 so as to be equidistantly arranged on the same circle of the second substrate 533.

The four protrusions 534 have curved surfaces such that a contact circle (inner contact circle) connecting inner surfaces 534b and a contact circle (outer contact circle) connecting outer surfaces 534c are formed thereby. The outer surface 534c may be tapered as explained with reference to FIG. 7.

The diameter of the outer contact circle is equal to the inner diameter of the annular electro-conductive member 510, and the inner diameter of the inner contact circle is adjusted to be larger than a hole 535.

The hole 535 of the igniter collar is formed to pass through the first substrate 532 and the second substrate 533 and has a size sufficient for the electro-conductive pins 18 to pass therethrough.

As shown in (b) in FIG. 8, the annular electro-conductive member 510 and the igniter collar 530 are assembled so that the inner circumferential surface 512a of the annular electro-conductive member 510 abuts against each of the outer surfaces 534c of the four protrusions of the igniter collar 530.

In this case, a portion of the cylindrical annular wall 512, in the inner circumferential surface 512a side, of the annular electro-conductive member 510 is on the second substrate 533, and the remaining portion of the cylindrical annular wall 512 protrudes from the second substrate 533.

Further, since the outer diameter of the outer circumferential surface 512b of the annular electro-conductive member 510 is equal to the outer diameter of the first substrate 532 of the igniter collar 530, the outer circumferential surface 512b and the outer circumferential surface 532a are flush with each other.

Therefore, an annular groove 540 is formed by the annular electro-conductive member 510, the outer circumferential surface 536 of the second substrate 533, and the first substrate 532. The relationship between the outer diameters of the first substrate 532 and second substrate 533 is such that the annular groove 540 capable of accommodating an O-ring is formed. Usually, when a groove with a convex cross section for fitting an O-ring is formed with a resin, a molding die assembled with a plurality of segmented sections is used. However, fine gaps are easily formed in the assembling zones in the die and after-molding protrusions can easily appear therein. If such protrusions are formed in the groove for fitting an O-ring, gaps are formed or the O-ring is damaged, and therefore the sealing performance can be decreased. In the embodiment in FIG. 8, such an inconvenience can be avoided.

The O-ring 340 is disposed in the annular groove 540 as shown in (c) in FIG. 8.

The igniter assembly shown in (c) in FIG. 8 can be manufactured by injection-molding a resin 15 in a predetermined metal die in which the igniter main body 14, and the assembly of the annular electro-conductive member 510 and igniter collar 530 (the assembly in (b) in FIG. 8) is disposed.

As shown in (c) in FIG. 8, distal end surfaces 534a of the four protrusions 534 are embedded in the resin 15, and portions of the inner surfaces 534b are exposed inside the connector-connecting portion 40.

The O-ring 340 is disposed when the igniter assembly is installed inside the housing 301.

When the igniter assembly such as shown in (c) in FIG. 8 is used in the gas generator 300 shown in FIG. 5, the housing 301 and the igniter collar 530 are in contact with each other in a state so as to enable an electric conduction, and inner surfaces 534b of the protrusions of the igniter collar serve as ground terminals.

Figure 9:
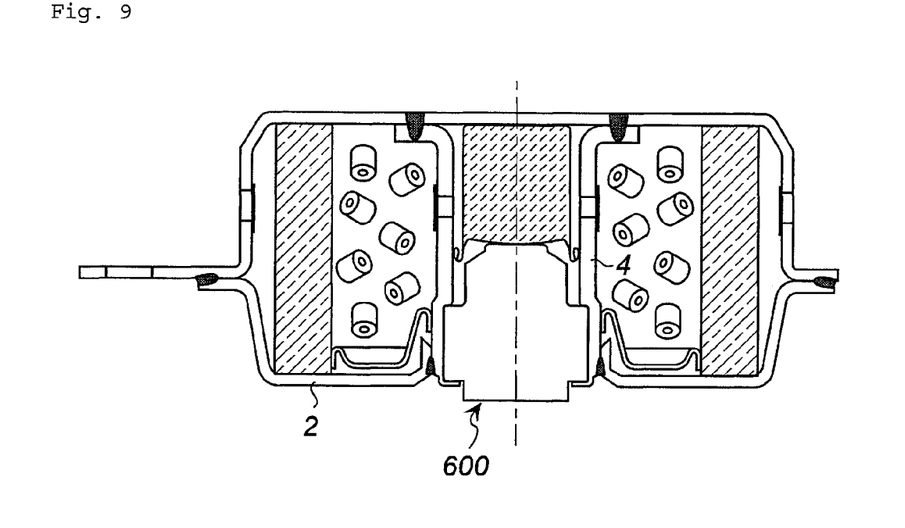
FIG. 9 shows an axial sectional view of a gas generator of yet another embodiment other than that shown in FIG. 1.

(3) Gas Generator Shown in FIG. 9

The components of the gas generator shown in FIG. 9 other than an igniter assembly 600 are identical to those of the gas generator shown in FIG. 1 of JP-A No. 2002-193069.

Figure 10:
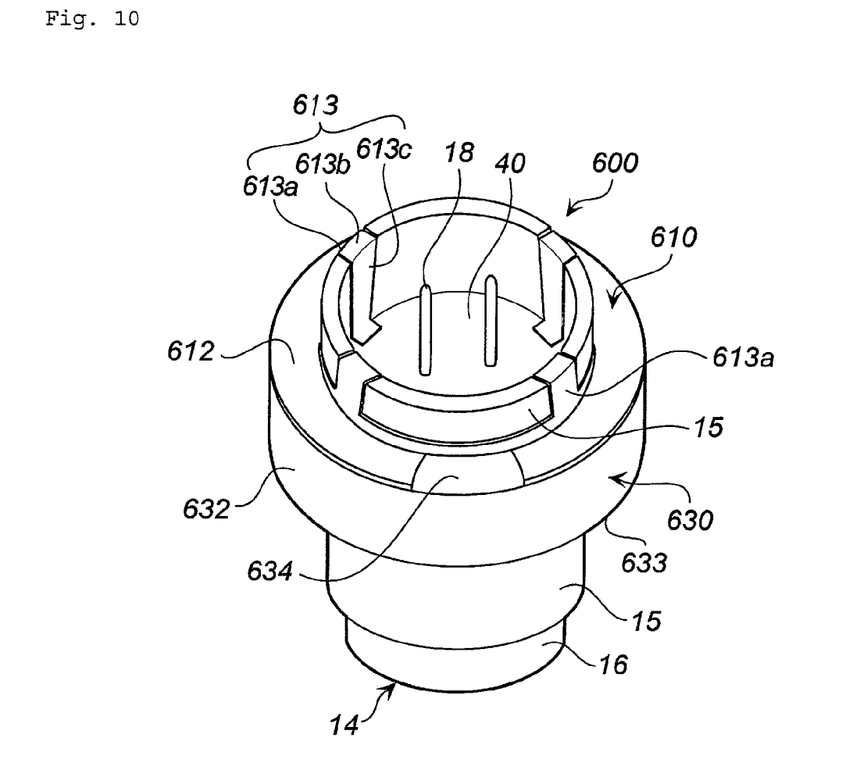
FIG. 10 shows a perspective view of the igniter assembly used in the configuration shown in FIG. 9.

In the igniter assembly 600 shown in FIG. 10, the igniter main body 14 and an igniter collar 630 are integrated by the resin 15, and an annular electro-conductive member 610 is further attached thereto.

The igniter main body 14 is identical to that shown in FIG. 1 and has the ignition portion 16 and electro-conductive pins 18.

The annular electro-conductive member 610 has an annular flat surface 612 and a ground terminal portion (plate-shaped member) 613 integrated with the annular flat surface 612. In FIG. 10, a portion of the annular flat surface 612 is removed so that the lower surface 634 of the igniter collar 630 could be clearly seen.

The ground terminal portion 613 is formed by a first connection section 613a connected to the annular flat surface 612, a curved section 613b, and a second connection section 613c positioned inside the connector-connecting portion 40. The resin 15 forms a cylindrical connector-connecting portion 40 in the lower surface 634 side of the igniter collar 630. The first connection section 613a is positioned outside the connector-connecting portion 40 (the resin tubular wall), the second connection section 613c is positioned inside the connector-connecting portion 40 (the resin tubular wall), and the curved section 613b is positioned in the end opening side of the connector-connecting portion 40 (the resin tubular wall).

A single ground terminal portion 613 may be used, but it is preferred that a plurality of the ground terminal portions be disposed equidistantly.

The metallic igniter collar 630 has an outer circumferential surface 632, an upper surface 633, and the lower surface 634.

The annular electro-conductive member 610 is assembled such that the annular flat surface 612 of the annular electro-conductive member abuts against the lower surface 634 of the igniter collar 630.

The igniter assembly 600 shown in FIG. 10 can be manufactured by injection-molding the resin 15 in a predetermined metal die in which an assembly of the igniter main body 14 and the igniter collar 630 is disposed, and then attaching the annular electro-conductive member 610.

Alternatively, it can be manufactured by disposing the annular electro-conductive member 610 and the assembly of the igniter main body 14 and the igniter collar 630 in a predetermined metal die and injection-molding the resin 15.

Figure 11:
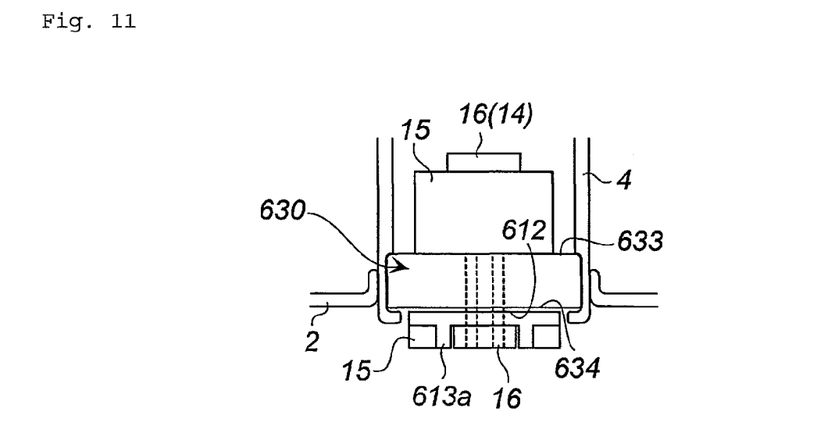
FIG. 11 shows a partial sectional view illustrating the state in which the igniter assembly shown in FIG. 10 is attached to the gas generator shown in FIG. 9.

When the igniter assembly 600 shown in FIG. 10 is installed in the gas generator shown in FIG. 9, the closure shell 2 and the inner cylindrical member 4 are brought into contact with each other, the inner cylindrical member 4 and the igniter collar 630 are brought into contact with each other, and the igniter collar 630 and the ground terminal portion 613 of the annular electro-conductive member 610 are brought into contact with each other in a state enabling the electric conduction, as shown in FIG. 11.

Therefore, ground terminal portion 613 serves as a ground terminal, and when the connector 60 such as shown in (a) in FIG. 1 is inserted into the connector-connecting portion 40 shown in FIG. 10, the earth terminal 63 of the connector 60 comes into contact with the ground terminal portion 613.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator comprising:
   a metallic housing;
   a gas generating agent provided within the housing;
   an ignition device accommodated in the housing and including an igniter assembly,
   the igniter assembly including,
      an igniter main body having an ignition portion charged with a priming, and
      an electro-conductive pin extending from the ignition portion;
      a metallic cylindrical fixing member for fixing the igniter main body by a resin; and
   a connector-connecting portion for accommodating a connector which is to be connected to the electro-conductive pin,
   an exposed portion of the metallic cylindrical fixing member, serving as a ground terminal, being exposed to an inner surface of the connector-connecting portion, the exposed portion being electrically connected to the metallic cylindrical fixing member, and
   when the connector is connected to the connector-connecting portion, the ground terminal being in contact with an earth terminal of the connector, a grounding lead wire of the connector being connected to a ground circuit provided separately from the gas generator.

2. A gas generator according to claim 1, wherein the metallic cylindrical fixing member is formed integrally with the housing.

3. A gas generator according to claim 1, wherein the metallic cylindrical fixing member is a metal retainer fixed to the housing, wherein
the metal retainer is of a cylindrical shape provided at an opening of a housing bottom plate to surround and fix the igniter assembly.

4. A gas generator according to claim 1, wherein
the ground terminal is an annular electro-conductive member that is disposed in contact with the metallic cylindrical fixing member to be exposed to the inner surface of the connector-connecting portion, and
the annular electro-conductive member is disposed in contact with the resin fixing the igniter main body.

5. A gas generator according to claim 1, wherein
the ground terminal is a substantially annular electro-conductive member abutting against a metallic igniter collar which is the metallic cylindrical fixing member,
the igniter collar has an annular shape,
the substantially annular electro-conductive member is inserted into the igniter collar,
the igniter collar and the housing are in contact with each other, and
a part of the substantially annular electro-conductive member is exposed to the connector-connecting portion.

6. A gas generator according to claim 1, wherein
the ground terminal is an annular electro-conductive member abutting against a metallic igniter collar which is the metallic cylindrical fixing member,
the igniter collar has an annular shape and a single or a plurality of protrusions around a hole,
the igniter collar and the annular electro-conductive member are assembled such that the inner circumferential surface of the annular electro-conductive member abuts against the protrusion of the igniter collar,
the igniter collar and the housing are in contact with each other, and the protrusion of the igniter collar is exposed to the connector-connecting portion.

7. A gas generator according to claim 1, wherein
the ground terminal is an annular electro-conductive member and abutting against a metallic igniter collar which is the metallic cylindrical fixing member,
the igniter collar has a first substrate including a larger diameter, a second substrate including a smaller diameter than the first substrate and formed on the first substrate, a central hole passing through the first substrate and the second substrate, and a single or a plurality of protrusions disposed annularly on the second substrate around the central hole,
the igniter collar and the annular electro-conductive member are assembled such that an inner circumferential surface of the annular electro-conductive member abuts against the protrusion on the second substrate, and such that a sealing member is disposed inside an annular groove formed by the annular electro-conductive member, second substrate, and the first substrate,
the igniter collar and the housing are in contact with each other, and the sealing member seals an inner circumferential surface of the metallic housing, and
the protrusion of the igniter collar is exposed to the connector-connecting portion.

8. A gas generator according to claim 1, wherein
the metallic cylindrical fixing member includes an annular electro-conductive member in contact with the metallic housing, and
the ground terminal is the annular electro-conductive member that is exposed to the inner surface of the connector-connecting portion, and
the annular electro-conductive member is disposed in contact with the resin fixing the igniter main body.

9. A gas generator according to claim 8, wherein
the ground terminal is the annular electro-conductive member exposed to the inner surface of the connector-connecting portion,
the annular electro-conductive member has a groove formed axially in an inner circumferential surface of an annular wall, and
the annular electro-conductive member is fixed such that the resin fixing the igniter main body is introduced in the groove, and part of the inner circumferential surface of the annular wall is exposed to the connector-connecting portion.

10. A gas generator according to claim 8, wherein
the ground terminal is the annular electro-conductive member, substantially annular in shape, exposed to the inner surface of the connector-connecting portion, and
the substantially annular electro-conductive member has a shape in which part of an annular wall is cut out and is fixed such that the resin fixing the igniter main body is also introduced in a cut-out portion, and part of an inner circumferential surface of the annular wall is exposed to the connector-connecting portion.

11. A gas generator according to claim 8, wherein
the ground terminal is the annular electro-conductive member exposed to the inner surface of the connector-connecting portion,
the annular electro-conductive member has a groove formed axially in an outer circumferential surface of an annular wall, and
the annular electro-conductive member is fixed such that the resin fixing the igniter main body is also introduced in the groove, and an entire of the inner circumferential surface of the annular wall is exposed to the connector-connecting portion.

12. A gas generator according to claim 8, wherein
the ground terminal is the annular electro-conductive member abutting against a metallic igniter collar of the metallic cylindrical fixing member,
the annular electro-conductive member has an annular flat surface and a plate-shaped member integrated with the annular flat surface,
the plate-shaped member has a first connection section extending vertically from the annular flat surface and a second connection section extending from an end of the first connection section to the annular flat surface through a curved section,
the metallic housing and the igniter collar are in contact with each other, and the igniter collar and the annular electro-conductive member are in contact with each other, and
the second connection section of the plate-shape member of the annular electro-conductive member is exposed to the connector-connecting portion.

* * * * *